United States Patent Office 3,524,020
Patented Aug. 11, 1970

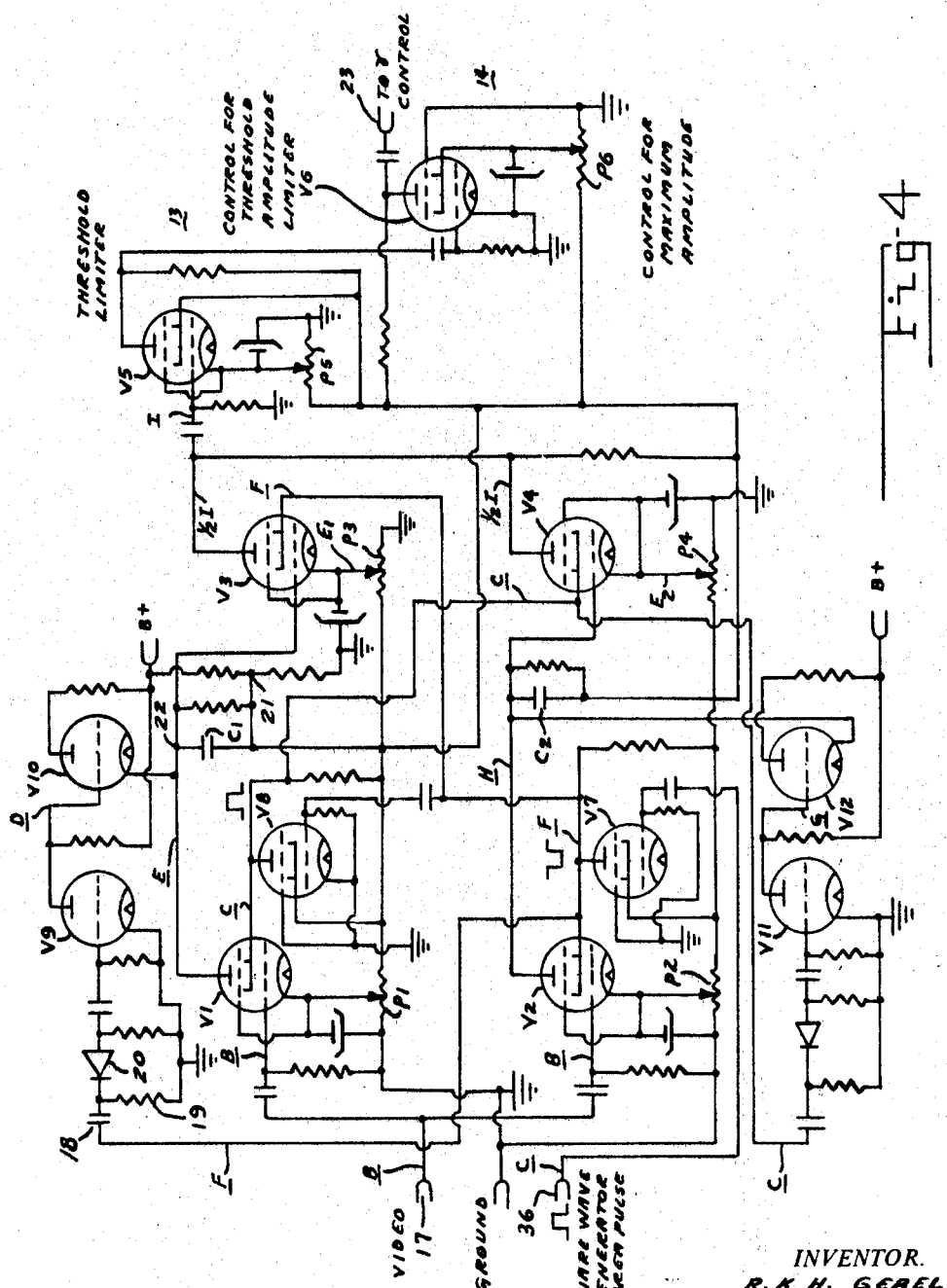

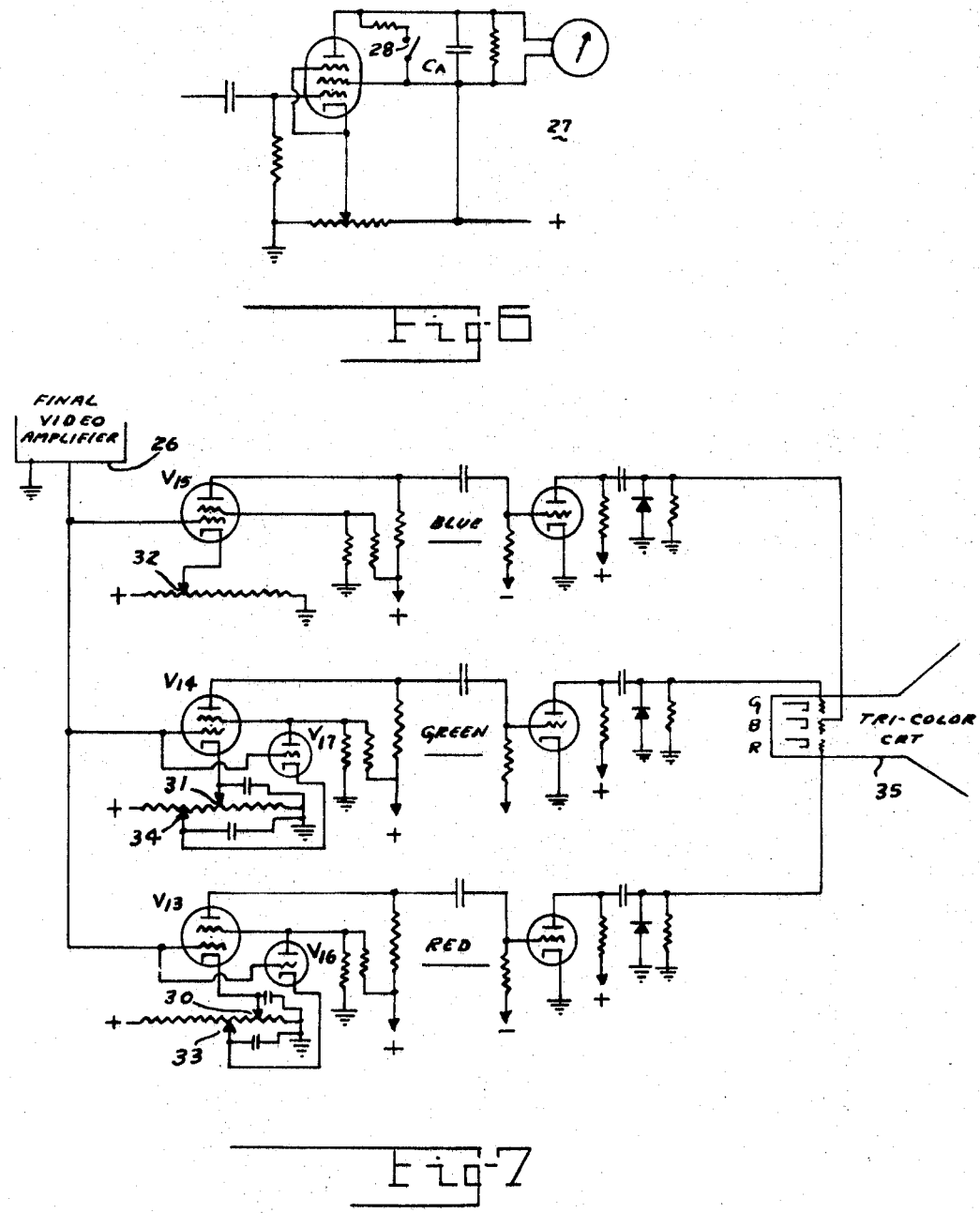

3,524,020
APPARATUS FOR OPTO-ELECTRONIC PHOTO-GRAPHIC IMAGE TRANSLATION
Radames K. H. Gebel, Dayton, Ohio, assignor to the United States of America as represented by the Secretary of the Air Force
Filed Mar. 28, 1968, Ser. No. 716,749
Int. Cl. H04n 3/34
U.S. Cl. 178—6.8           5 Claims

ABSTRACT OF THE DISCLOSURE

Apparatus for producing a gray scale representation of a photographic image of low density and contrast in which a television pickup tube scans each of equal predefined square resolution elements of the image and produces a video signal which is integrated over the elemental scanning interval to produce a brightness signal proportional to the fraction of the area of the square element occupied by silver grains. The brightness signal is used to modulate the beam of a kinescope to produce the gray scale representation. Scanning of the square elements in both pickup tube and kinescope is effected by a small vertical oscillation or wobble of the scanning beam as it moves horizontally.

BACKGROUND OF THE INVENTION

The invention is concerned with the extraction of information from photographic images of very low density and contrast such as obtained, for example, in astronomical photography.

The ultimate limits imposed upon the photodetection of objects by the stochastic nature of radiation and the randomness inherent in energy conversion are discussed in a paper by R. K. H. Gebel entitled "A Study of Basic Factors Governing the Detection Limit in Astronomical Imaging" presented at IMEKO–IV (International Measurement Confederation), Symposium on Photon-Detectors, held at Warsaw, Poland, during July 3–8, 1967, and published by Druckschriftenabteilung der Kammer der Technik, 106 Clara-Zetkinstrasse, 108 Berlin, Germany.

The radiation receiving surface of a photodetector may be considered an orthogonal matrix made up of small square resolution elements the response of each of which depends upon the number of photons falling within its boundaries in a given time interval. In photography, the time interval is the exposure time and the response is in the number of silver halide grains which undergo a latent change that permits them to be transformed by the developer into colloidal silver. The information contained in an individual resolution element of a developed photographic negative therefor may be said to be in the number of silver grains contained in the area or, more precisely, since the silver grains may vary in size, in the fraction of the total area of the resolution element occupied by silver grains.

In astronomical photography the object brightness may be no greater than and, in fact, may be less than the stray light in the field of view. The image may therefore be represented by no more than a slight increase in the silver grain population density in the resolution elements covered by the image. Even after enlargement it is difficult for the unaided eye to perceive such an image since it tends to see the individual silver grains rather than to perform the integration necessary to sense the image.

U.S. Pat. 3,115,545, Dec. 24, 1963, issued to R. K. H. Gebel, described apparatus for producing a gray scale representation of a photographic image of the above type that could be interpreted by the human eye. In the system described in this patent a television pickup tube was used to scan the photograph and produce a video signal that varied in proportion to the grain density in each of the resolution elements of the photograph. For this purpose the scanning beam cross section was enlarged to correspond to the size of the resolution element and the elements were either scanned in steps with beam blanking during movement between elements or were scanned at a constant rate by a normally blanked beam which was momentarily unblanked when centered on each resolution element. The resulting video or brightness signal was used to modulate the beam of a kinescope to produce the gray scale reproduction.

SUMMARY OF THE INVENTION

The present invention is an improvement on the system described in the above-referenced patent in at least two respects. First, square resolution elements are employed rather than the essentially round resolution elements defined by the enlarged scanning beam of the patent. The square elements cover the area of the photograph more completely than is possible with round elements and thereby come closer to containing all of the information of the photograph. Secondly, rather than produce the brightness signal by means of a beam large enough to encompass the entire resolution element as in the patent, a very small beam, corresponding in size to the smallest silver grain, scans the area of each square resolution element to produce a video signal which is integrated over the elemental scanning interval to produce the brightness signal. This also produces a more accurate result since it insures that the contribution of any silver grain to the brightness signal is independent of its position in the area of the resolution element. This might not be true for the large beam due to the variation in its intensity over its cross-sectional area. The scanning of the square elements is accomplished by a vertical oscillation or wobble of the beam as it scans horizontally, the amplitude of this oscillation corresponding to the vertical dimension of the resolution element. The horizontal dimension of the element is defined by a periodic and alternate switching of the video signal produced by the scanning operation to a pair of integrating circuits which produce the brightness signal. For production of a gray scale image, the brightness signal is used to modulate the beam of a kinescope which also has a similar vertical oscillation imparted to its scanning beam.

BRIEF DESCRIPTION OF THE DRAWINGS

FIG. 4 is a schematic diagram of the area integrator circuit, the threshold limiter, and the amplitude limiter of FIG. 1;

FIG. 6 is an averaging circuit for determining limiter threshold setting; and

FIG. 7 shows a tri-color scheme for indicating brightness levels.

DESCRIPTION OF THE PREFERRED EMBODIMENT

Figure 1:
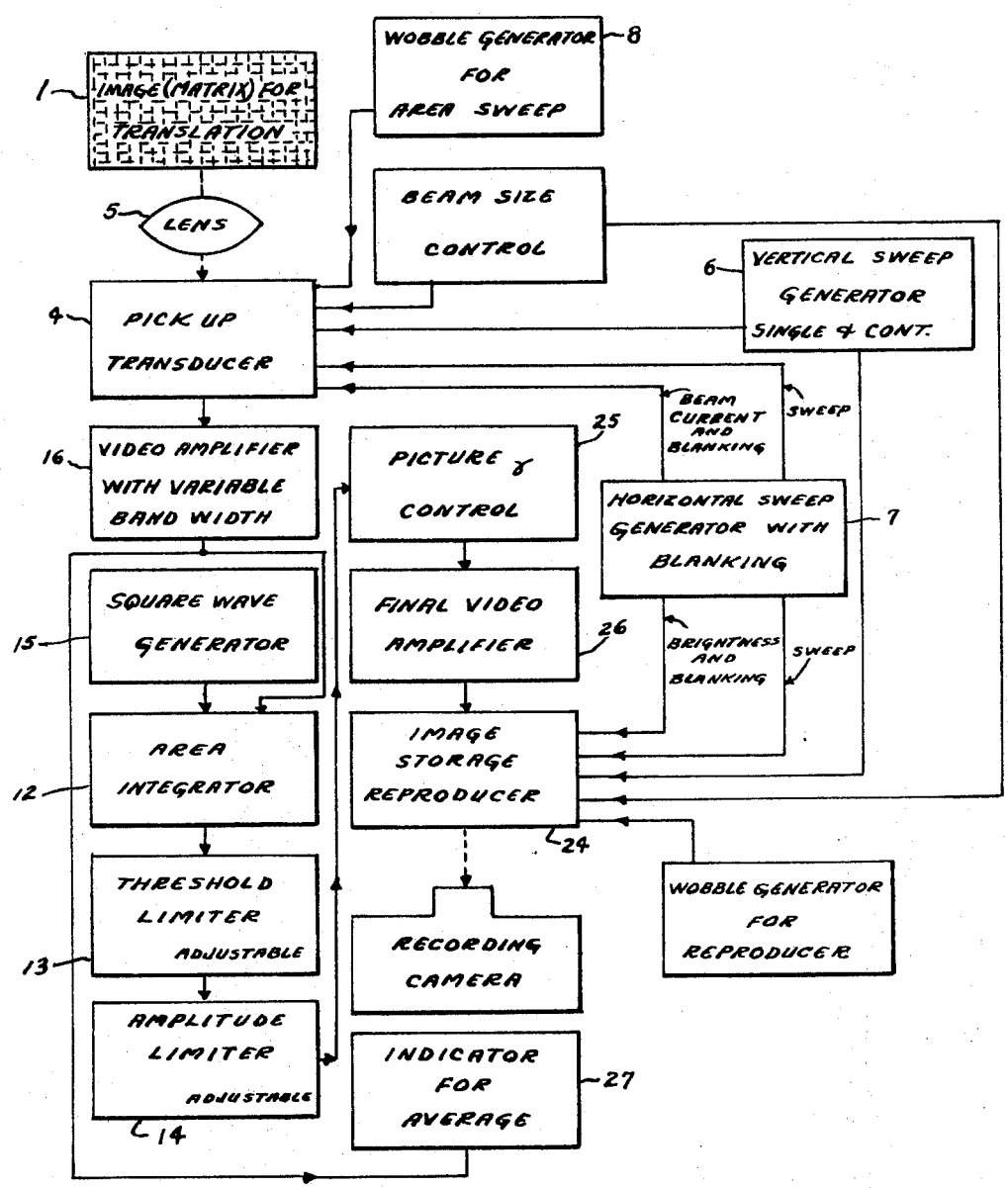
FIG. 1 is a block diagram of an opto-electronic photographic image translating system in accordance with the invention.
Figure 2:
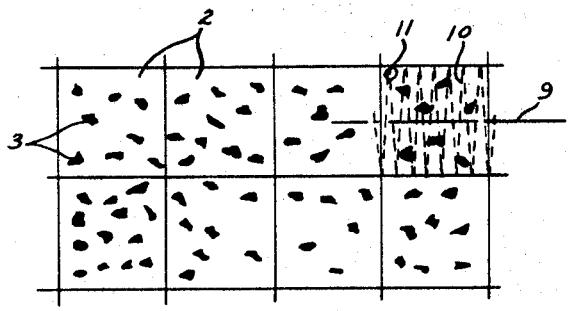
FIG. 2 illustrates the grains of an enlarged low contrast low density photographic negative and the predefined square resolution elements of which it may be considered to be composed.

Referring to FIG. 1, 1 represents a photograph to be translated in accordance with the invention. The small predefined square resolution elements into which the photograph may be considered to be divided are illustrated in greatly enlarged form by the vertical and horizontal broken lines. FIG. 2 illustrates a small section of such a photograph. The square resolution elements 2 are selected small enough to provide the required image resolution but large enough to contain many of the developed silver grains 3 of the photograph.

An optical image of photograph 1 is formed on the photocathode of a television pickup transducer 4 by a suitable optical system represented by lens 5. The transducer 4 may be any suitable television pickup device such as the image orthicon or the vidicon. These devices are well known in the art and described in the literature, the image orthicon for example in the RCA Review for June 1949, p. 191, and September 1949, p. 49, and in U.S. Pat. 2,460,093, and the isocon in Electronics, May 1950, p. 70. In either case, the photocathode of the transducer produces a corresponding electron image that is brought to focus on a target electrode which acquires as a result a positive charge distribution corresponding to the grain distribution in the photograph. If the photograph is a negative, as illustrated in FIG. 2, and if transducer 4 is an image orthicon, then the silver grains 3 will be represented on the target electrode as corresponding areas of zero positive charge, whereas the areas between grains, all assumed to be equally transparent and evenly illuminated, will be represented on the target electrode by areas of uniform positive charge. In the image orthicon the charge pattern on the target electrode is neutralized by a low velocity scanning electron beam with the beam electrons in excess of those required to neutralize the charge becoming the video signal. Therefore, in the present example, the presence of a silver grain in the photograph is represented by a maximum video signal and the absence of a grain by a minimum video signal.

The electron beam in transducer 4 is caused to scan the target electrode under the influence of vertical and horizontal sweep generators 6 and 7 in conventional manner except that interlacing would not be necessary. In addition, wobble generator 8 imparts a small vertical oscillation to the beam as it scans horizontally. The amplitude of this oscillation equals the vertical dimension of the square resolution element, as illustrated in FIG. 2 considering this figure to now represent the charge pattern image of the photograph on the image orthicon target electrode with the dark areas 3 now representing areas of zero positive charge and the light areas representing areas of equal positive charge, as explained above. Referring to this figure, the line 9 represents the normal horizontal scanning direction of the beam about whch the beam oscillates. This oscillation is represented for one of the square resolution elements by the broken line 10 which indicates approximately the path traveled by the center of the scanning beam cross section 11. As stated earlier, the scanning spot 11, that is the cross section of the beam, corresponds in size to the smallest silver grain, and the frequency of the oscillation, or the number of oscillations occurring during the interval required for the beam to move horizontally across the resolution element, is made such that a scanning spot of this size will cover all of the area of the square resolution element during the scanning process with a minimum of overlap.

The simplest method of applying the vertical oscillation or wobble to the scanning beam is by the use of an additional vertical deflection coil on the deflection yoke of the transducer tube which is supplied with a deflection current of proper waveform by wobble generator 8. The current waveform that would most nearly meet the above-specified scanning requirement of covering the entire elemental area with a minimum of overlap would be rectangular. However, the production of a rectangular current wave in the inductive circuit of the deflection coil would require a special wave shaping network. Similarly, other special waveforms such as sawtooth or triangular also require wave shaping networks. On the other hand, a sinusoidal waveform in the deflection coil is easy to achieve and the improvement obtained by the above special waveforms over the results obtained with a sinusoidal waveform is not enough to justify the added complexity. Therefore, a sinusoidal waveform is preferred.

The size of the charge image of the photograph on the target electrode of the image orthicon, which as stated above may be represented by FIG. 2, is determined by the resolving capabilities of the image orthicon. Starting with the smallest practical scanning beam size, or with a scanning beam size dictated by other considerations, the magnification of the photographic image is made such that the areas of zero positive charge on the target electrode representing the smallest silver grains of the photograph correspond in size to the scanning beam. This magnification may be achieved by enlargement of the photograph 1, or by the optical system 5, or by the electron optics of the electron image section of the image orthicon, or by a combination of these methods.

Figure 3:
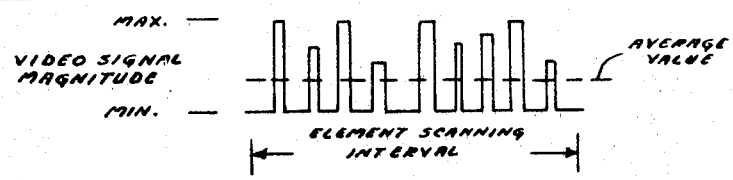
FIG. 3 shows the waveform of the video signal produced by transducer 4 of FIG. 1.

Again considering FIG. 2 to represent the positive charge image of the photograph on the target electrode of the image orthicon, in the manner described above, the scanning of one of the square resolution elements 2 by the scanning beam, represented by spot 11, traveling along the scanning pattern represented approximately by broken line 10 produces a sequential video signal which may be represented by a waveform such as shown in FIG. 3. When the beam is scanning over the light areas of the element, which represent areas of uniform positive charge as previously explained, the video signal has its minimum value. When the beam scans over a dark area, which represents an area of zero positive charge corresponding to a silver grain in the photograph as previously explained, the video signal has its maximum value if the scanning spot is contained entirely within the dark area or a value intermediate the minimum and maximum values of the scanning spot is not totally intercepted by the dark area. The average value of the video signal taken over the interval of time required to scan the square resolution element is proportional to the fraction of the area of the resolution element of the photograph occupied by silver grains.

The derivation of a signal proportional to the above average value for each of the resolution elements of the photograph is accomplished by area integrator 12. A schematic diagram of the area integrator, as well as the subsequent threshold limiter 13 and amplitude limiter 14, is shown in FIG. 4, with waveforms illustrating the operation of these circuits being shown in FIG. 5.

Figure 5:
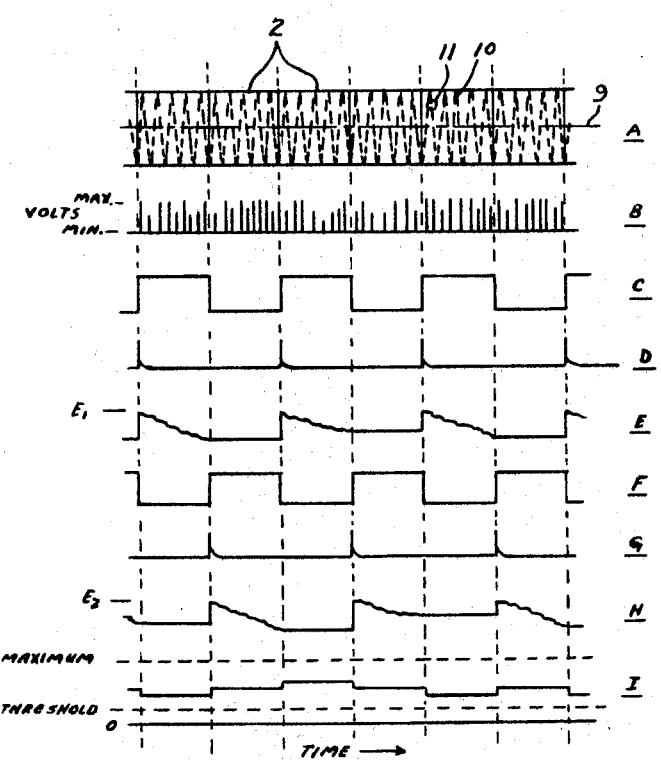
FIG. 5 gives waveforms illustrating the operation of the circuit of FIG. 4.

Referring to FIGS. 4 and 5, graph A of FIG. 5 illustrates a portion of a horizontal row of square resolution elements on the target electrode being scanned by the scanning beam 11 in the manner already explained for FIG. 2. The video signal produced by the transducer 4 (FIG. 1) as the result of this scanning, after amplification in video amplifier 16, is represented by waveform B and is applied to the circuit of FIG. 4 at terminal 17 and thence to the control grids of $V_1$ and $V_2$ in parallel. Square wave generator 15 (FIG. 1) produces at terminal 36 of FIG. 4 a square wave which may be represented by waveform C of FIG. 5. This waveform is applied through tubes $V_7$ and $V_8$ to the screen grid of $V_1$ where, due to double inversion by $V_7$ and $V_8$, it may still be represented by waveform C. The inverted waveform C at the anode of $V_7$, represented by waveform F, is applied to differentiating circuits 18–19, which produces sharp negative-going and positive-going pulses from the negative-going and positive-going edges of the square wave. The positive-going pulses are blocked by diode 20 leaving the negative-going pulses to be applied to the control grid of $V_9$. These produce positive-going pulses at the anode of $V_9$ and the control grid of $V_{10}$ which may be represented by waveform D of FIG. 5.

The purpose of capacitor $C_1$ is to integrate the video signal B applied to the grid of $V_1$ over each of the scanning intervals of one half of the square resolution elements 2, the integration for the other half of the elements being accomplished by capacitor $C_2$ as explained later. The scanning interval equals one half-period of square wave C, the period of this wave being correlated with the horizontal sweep velocity of transducer 4 to produce a square resolution element of the desired horizontal dimension. In order to perform this integration the charge in $C_1$ must be adjusted to a fixed initial value at the start of each integration interval. This is accomplished by the positive-going pulses of waveform D on the control grid of $V_{10}$ which is biased to cut off in the absence of a pulse D. When a pulse D occurs, which as seen in FIG. 5 is at the start of each integration interval for $C_1$ as defined by the positive-going half-cycles of waveform C, tube $V_{10}$ becomes highly conductive for the duration of the pulse, causing the upper terminal 22 of $C_1$ to rapidly rise in potential to a value $E_1$ determined by the setting of potentiometer $P_3$, the potential of the terminal being effectively clamped at the value $E_1$ by grid conduction in $V_3$. Since the lower terminal of $C_1$ is held at the fixed voltage of potential divider point 21 at all times, this action establishes equal charges in $C_1$ at the start of all integration intervals.

The control grid bias of $V_1$ is so adjusted at $P_1$ that the strongest video signal on its control grid is just short of the value required to produce anode conduction in the absence of a positive pulse on the screen grid of this tube. During the elemental scanning or integrating intervals as defined by the positive half cycles of wave C, each video pulse on the control grid of $V_1$ causes current to flow from point 21 into capacitor $C_1$ and thence through the anode-cathode path of $V_1$ to ground, thus changing the capacitor charge by an amount proportional to the area of the pulse. As result, the potential of the upper terminal 22 of $C_1$ falls in steps during the scanning of the square elemental area as illustrated by waveform E of FIG. 5. At the end of the scanning interval $V_1$ is again cut off and the change in the charge in capacitor $C_1$ that occurred during the scanning interval, as represented by the change in potential of terminal 22, is proportional to the average value of the video signal, as illustrated in FIG. 3, and therefore to the fraction of the square elemental area of the photograph occupied by silver grains.

During the scanning intervals of $C_1$, $V_3$ is cut off by the negative half-cycles of waveform F which is applied to its screen grid by a connection between this grid and the anode of $V_7$. At the end of each scanning interval, $V_3$ is rendered operative by the positive half-cycle of wave F on its screen grid and the anode assumes a potential corresponding to the potential at point 22 to which its control grid is connected, this potential holding substantially constant during the halfcycle due to a relatively long time constant for the $C_1$ discharge circuit. The potentials at the anode of $V_3$ during the positive half-cycles of wave F therefore correspond to the potentials at point 22 at the end of the elemental scanning intervals and constitutes the brightness signal for the square elementals area scanned. These brightness signals are illustrated by those portions of waveform I of FIG. 5 that are coincident with the positive-going half-cycles of square wave F.

It is evident from the above discussion that $C_1$ performs the integration only for alternate resolution elements 2, or only for one half of the total number of these elements. Integration for the remaining elements is performed by capacitor $C_2$ in a circuit that is identical to that described above for $C_1$ and include tubes $V_2$, $V_7$, $V_{11}$, $V_{12}$ and $V_4$ which perform the same functions as tubes $V_1$, $V_8$, $V_9$, $V_{10}$ and $V_3$ of the $C_1$ circuit. Tube $V_2$ operates alternately with $V_1$ and $V_4$ alternately with $V_3$ under the control of waveforms C and F applied to their screen grids. $V_4$ supplies that part of the brightness signal I of FIG. 5 that is coincident with the positive-going half-cycles of waveform C. The brightness signals from $V_3$ and $V_4$ are combined at the control grid of $V_5$ to produce the complete brightness signal represented by waveform I of FIG. 5.

Threshold circuit 13 establishes the minimum value of the brightness signal I for which an output will be produced at terminal 23. This threshold is determined by the control grid bias which is provided by adjustable potentiometer $P_5$. Amplitude limiter 14 establishes the maximum brightness signal that can occur at output terminal 23. It comprises a pentode $V_6$ which has the output of $V_5$ applied to its control grid and a screen potential that is adjustable at potentiometer $P_6$. Due to the signal inversion produced by $V_5$ the control grid of $V_6$ moves in a negative direction toward anode cut off as the brightness signal I increases. When anode cutoff occurs no further rise in the signal at terminal 23 is possible. The point at which anode cutoff occurs can be adjusted by adjusting the $V_6$ screen voltage at $P_6$.

Before application to the beam intensity control electrode of the cathode ray reproducer 24 the output signal of limiter 14 may be modified by gamma control 25 and amplified in video amplifier 26. The basic purpose of the gamma control circuit is to match the brightness range of the optical image formed on the photosensor of pickup device 4 to the brightness range of the reproducer 24. A suitable circuit for this purpose is shown and described in the above referenced Pat. No. 3,115,545. Any suitable kinescope may be employed for reproducer 24. If a storage type is used only one scanning cycle in the pickup 4 and reproducer 24 is required. Otherwise, continuous frame scanning must take place for as long as the image is desired on the kinescope screen. Like the scanning beam in pickup transducer 4, the scanning beam of the reproducer has a small vertical oscillation or wobble imposed to establish the vertical dimension of square resolution elements on the reproducer corresponding to the square resolution elements of the photograph. The wobble need not be synchronized with that at the pickup transducer; also a larger beam size and lower frequency may be employed within the limits imposed by the size of the square resolution element. The brightness of each of these resolution elements is proportional to the magnitude of the corresponding portion of the brightness signal I of FIG. 5 which, in the manner already explained, is proportional to the fraction of the total area of the corresponding resolution element in the photograph occupied by silver grains.

By setting the threshold of circuit 13 by means of potentiometer $P_5$ at the proper level, the background or stray light in an astronomical photograph may be eliminated or greatly reduced leaving only the objects of interest in the field. In most instances this may be done successfully by trial. However, since the average brightness of the photograph is proportional to the background illumination, an averaging circuit 27 such as shown in FIG. 6 for obtaining an indication of average brightness may be used as a guide in setting the threshold. This circuit employs a capacitor $C_A$ to average the video signal over a frame in the same manner that $C_1$ and $C_2$ average the video signal over a square resolution element. For single frame scanning using a storage reproducer 24, the capacitor charge can be reduced to an initial or starting value of zero by momentarily closing switch 28. For continuous frame scanning using a conventional reproducer, the operation of the scanning circuit would be synchronized with the vertical sweep in a manner not shown but similar to the synchronization of the operation of the $C_1$ and $C_2$ integrating circuits with the square resolution element scanning already described.

Where the contrast in the gray scale representation produced as described above is so low that different brightness levels are hard to distinguish, an improvement may be obtained by producing different brightness level ranges in different colors. A system in which the video signal is separated into three brightness ranges which are displayed in the colors red, green and blue of a tri-color television tube is shown in FIG. 7. The brightness signal from final video amplifier 26 (FIG. 1) and represented by waveform I of FIG. 5 is applied in parallel to the control grids of screen grid tubes $V_{13}$, $V_{14}$ and $V_{15}$. These tubes are given successively higher amplitude thresholds by increasingly more negative control grid biases provided by adjustable contacts 30, 31 and 32. Further, triode $V_{16}$ has its threshold set at contact 33 to the same threshold as $V_{14}$, and $V_{17}$ has its threshold set at contact 34 to the same threshold as $V_{15}$. Therefore, a brightness signal falling within the magnitude range the lower and upper limits of which are set by contacts 30 and 33, respectively, produces an output from $V_{13}$ which energizes the red gun of tri-color tube 35. No output occurs from $V_{14}$ or $V_{15}$ since the brightness signal level is below the thresholds of these tubes. When the brightness signal magnitude reaches the conduction threshold of $V_{16}$, as determined by the setting of contact 33, this tube conducts lowering the screen grid potential of $V_{15}$ sufficiently to reduce the output from this tube to zero. Since $V_{14}$ has the same threshold as $V_{16}$, any further increase in brightness signal magnitude produces an output from $V_{14}$ which energizes the green gun of reproducer 35. In the same manner as described for $V_{13}$ and $V_{16}$, when the brightness signal level reaches the upper limit of the green range $V_{17}$ conducts reducing the output of $V_{14}$ to zero. Brightness levels above this value exceed the threshold of $V_{15}$ the output of which energizes the blue gun of tri-color tube 35.

Tubes $V_{13}$, $V_{14}$ and $V_{15}$ have high amplification factors and are operated with relatively low screen grid potentials. With this arrangement a signal level slightly above threshold produces full output from the tube so that the color gun of the reproducer 35 receives substantially the same signal on its control grid for all values of brightness signal falling within the range of the particular tube.

The reproducer 24 which constructs the gray scale representation of the photograph is preferably of the cathode ray type in which an electron beam produces a spot of light on a phosphor screen that can be made to scan over the area of the screen by deflection of the electron beam, and in which means are provided for controlling the intensity of the electron beam and thereby the brightness of the spot. However, any other type of reproducer providing a scanning light spot of controllable intensity may be used. Although wobbling of the reproducer light spot about its mean direction of travel is employed in the preferred embodiment, this is not essential under all circumstances. Where it is practical to make the light spot size commensurate with the size of the square resolution element on the reproducer screen, wobbling is not necessary. Wobbling should be employed with the tri-color reproducer in all cases, however. The square shape of the resolution element employed in the preferred embodiment likewise is not essenital but is the most reasonable choice. Rectangular shapes other than square may be used. These would require wobbling of the reproducer spot unless the spot could be given a corresponding rectangular shape.

What is claimed is:
1. Apparatus for producing a gray scale representation of the variation in average silver grain density in a photograph of low contrast, comprising: a transducer having apparatus for effectively scanning said photograph with a scanning spot approximately equal in size to the smallest silver grain to produce a video signal of instantaneous magnitude varying between maximum and minimum values depending upon the fraction of the scanning spot intercepted by a silver grain, said scanning apparatus having means for moving said scanning spot at a constant rate of progression along parallel means scanning paths separated by a distance equal to the side of a predefined square resolution element selected small enough to provide the required resolution in said gray scale representation but large enough to include many silver grains and means for imparting to said scanning spot an oscillation about its mean path of peak-to-peak amplitude equal to said mean path separation; means for averaging said video signal over successive intervals equal to the time required for said scanning spot to progress along its mean path a distance equal to the mean path separation; a picture reproducer of the type providing a spot of light that scans over a screen, said reproducer having means for controlling the brightness of said spot; means synchronized with the scanning apparatus of said transducer for scanning said light spot over the reproducer screen along parallel mean scanning paths in the same manner that the scanning spot of said transducer scans the photograph; and means for applying said average signal to the spot brightness control means of the reproducer.

2. Apparatus as claimed in claim 1 in which the light spot of the reproducer is small relative to the separation of the mean paths on the reproducer screen, and means are provided for imparting to said spot of light an oscillation about its mean path of peak-to-peak amplitude equal to the mean path separation.

3. Apparatus as claimed in claim 1 in which the light spot of said reproducer has a diameter equal to the mean path separation on the reproducer screen.

4. Apparatus as claimed in claim 2 in which the scanning light spot of the reproducer has any of three colors and in which brightness control means are provided for each color, and in addition there is provided amplitude selective means defining three continuous amplitude ranges which receives said average signal and is coupled to the three brightness control means for selecting one of the three colors depending upon the amplitude range within which the average signal lies.

5. Apparatus as claimed in claim 1 in which the means for averaging the video signal comprises: means for generating a constant frequency square wave having a half-period equal to the time required for the scanning spot of the transducer to progress along its mean scanning path a distance equal to the said path separation; a pair of capacitors; a normally inoperative discharge means connected to each capacitor; means for applying said video signal to each of said discharge means for controlling, when the discharge means is operative, the rate of current flow therethrough in accordance with the magnitude of the video signal; means controlled by said square wave for rendering said discharge means alternately operative for half-periods of the wave; means controlled by said square wave for establishing the voltage across each capacitor at a fixed initial value at the start of each operative interval of the discharge means associated with the capacitor; normally inoperative transfer means coupled to each capacitor for transferring, when operative, the capacitor voltage to an output circuit; and means controlled by said square wave for rendering each transfer means operative for a half-period of the square wave immediately following each half-period of operativeness of the discharge means for the capacitor to which the transfer means is coupled, the capacitor voltage so transferred to said output circuit constituting the average of the video signal.

References Cited

UNITED STATES PATENTS 3,115,545    12/1963    Gebel _____ 356—203 X

ROBERT L. GRIFFIN, Primary Examiner

R. K. ECKERT, JR., Assistant Examiner

U.S. Cl. X.R.

356—103, 203